2,999,849
SULFONE POLYESTERS

Donald M. Young, Geneva, Switzerland, and Christian F. Horn, New York, N.Y., assignors to Union Carbide Corporation, a corporation of New York
No Drawing. Filed Oct. 7, 1957, Ser. No. 688,423
13 Claims. (Cl. 260—75)

This invention relates to novel polyesters and shaped articles such as filaments, films and molded products thereof, as well as to a method for their preparation.

In accordance with the invention, it has been found that polyesters having recurring structural units of the general formula I.  —OR'OOC—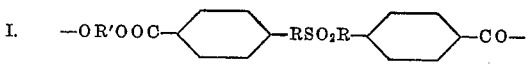—RSO$_2$R—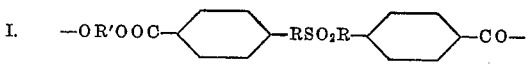—CO— wherein the R's are saturated alkylene radicals containing from one to five carbon atoms and the R's are divalent saturated alkylene, alkylene ether or aralkylene radicals containing from two to ten carbon atoms, can be prepared by reaction of alpha,omega diols containing from two to ten carbon atoms with diaralkylene monosulfones of the general formula II.  SO$_2$[R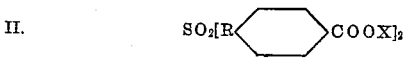COOX]$_2$ in which the R's are as defined in Formula I and the X's are saturated lower alkyl radicals capable of forming alcohols having boiling points below about 200° C. under the conditions of operation.

The polyesters of the invention, and shaped articles thereof, have a considerable number of important advantages. They are crystalline and possess a high degree of chemical stability as evidenced by their insolubility in water, dilute inorganic and organic acids, alkalies, and most organic solvents. They are capable of absorbing coloring materials and are therefore readily dyed. They possess good dielectric properties and moisture regain and are bright, tough resins that can readily be formed into fibers and films which, upon being cold-stretched, have excellent strength, resiliency and pliability.

The diaralkylene monosulfones that are preferred as starting materials in accordance with the method of the invention are those identified in Formula II in which the X's are methyl or ethyl groups and in which the R's are unsubstituted methylene chains, such compounds as dimethyl 4,4'-sulfonylditoluate, dimethyl 4,4'-[sulfonyldiethylene]dibenzoate and dimethyl 4,4'-[sulfonyl-bis(trimethylene)]dibenzoate being preferred. Also included among the diaralkylene monosulfones that are suitable as starting materials are the next higher homologues, dimethyl 4,4'-[sulfonyl-bis(tetramethylene)]dibenzoate and dimethyl 4,4'-[sulfonyl-bis(pentamethylene)]dibenzoate as well as those having branched chain alkylene radicals such as dimethyl beta,beta'-sulfonyl-bis(p-propylbenzoate) and dimethyl gamma,gamma'-sulfonyl-bis[p-(beta,-beta'-dimethylpropyl)benzoate]. In addition, it is to be understood that higher alkyl diesters such as ethyl, propyl, etc. are operable so long as the terminal alkyl radicals are capable of forming alcohols boiling below about 200° C. and that the corresponding acids, acid chlorides, diamides and other polymerizable derivatives are likewise operable.

The diaralkylene monosulfones can be prepared in several ways. One method of preparation that has been found suitable involves reacting a chloride,

RCl in which the R is as defined with reference to Formula I, with acetyl chloride in the presence of aluminum chloride as a catalyst and carbon disulfide as the reaction medium to form the corresponding acetophenone, oxidizing the acetophenone with an alkaline hypobromite solution and then acidifying with hydrochloric acid to form the corresponding para-benzoic acid, reacting the latter with sodium sulfide to form the corresponding 4,4'-(thiodialkylene)dibenzoic acid and then oxidizing with peracetic acid or other suitable oxidizing agent to convert the thio acid into the corresponding sulfonyl dibenzoic acid. If a diester is desired, the sulfonyl dibenzoic acid can be esterified with the appropriate alcohol. The sequence of reaction is illustrated as follows:

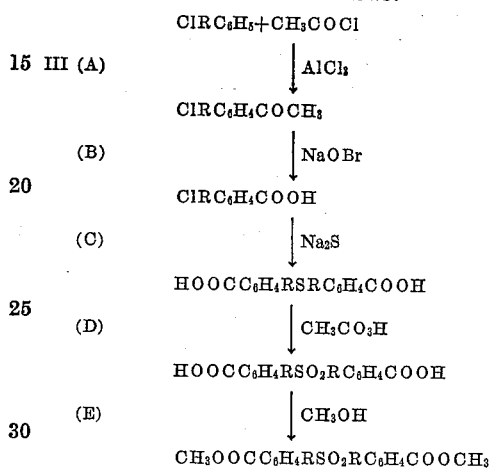

The R's, as in Formula I, stand for saturated divalent alkylene radicals containing up to five carbon atoms.

The alpha,omega diols that are suitable as starting materials in accordance with the invention include, as indicated in the definition of R' in Formula I, dihydroxy compounds of the general formula

IV.  R'(OH)$_2$ in which R' is a divalent saturated alkylene, alkylene ether or aralkylene radical containing from two to ten carbon atoms. These include polymethylene alpha,omega glycols of the formula HO(CH$_2$)$_n$OH in which $n$ is an integer from 2 to 10, branched chain alpha,omega glycols such as 3-methyl-1,5-pentanediol, alkylene ether glycols such as triethylene glycol and aralkylene diols such as p-xylylene glycol.

The reaction of the primary starting materials in forming substantially linear polyesters is believed to take place in essentially two stages, an ester exchange reaction and a polycondensation. While there is reason to believe that these stages are not necessarily separate and distinct and that they may at least in part take place simultaneously, the mechanism of the reactions is set forth to facilitate ready comprehension of the method involved:

V.
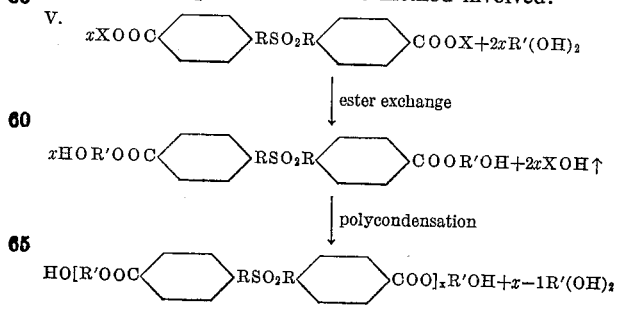

It will be evident that the ester exchange reaction involves substantially complete elimination of the X alkyl radicals in the form of the corresponding alcohol and that the polycondensation involves the elimination of excess glycol. It follows that for most effective preparation of the linear polymers and removal of the alcohol formed in the ester exchange stage, the alkyl radicals X should be lower alkyl, preferably methyl, radicals so that the resulting alcohol will have a relatively low boiling point, or at least a lower boiling point than the excess glycol eliminated in the second stage. It is also apparent that the boiling point of the glycol used as initial reactant is at least partially determinative of the conditions for polycondensation and removal of excess glycol. If a relatively low boiling glycol, e.g., ethylene glycol, is used, it can be used in considerable excess because a substantial amount can be distilled without in the least degrading the polymer through thermal decomposition. If, however, a higher boiling glycol such as 1,7-heptanediol is used, it is desirable to use a smaller excess.

The initial reactants are admixed, preferably with a catalyst, and subjected to conditions producing ester interchange until the ester interchange is substantially complete. These conditions involve heating the reactants to a temperature sufficiently high to bring about the reaction and to eliminate the alcohol formed thereby. Depending upon the glycols used, temperatures of the order of about 150 to 250° C. are ordinarily sufficient to initiate and complete the ester interchange. For polycondensation and elimination of the glycol, the temperature employed is above the melting point of the polymer and below the temperature at which the polymer becomes thermally unstable. As a rule, this temperature of polycondensation is advantageously about 8 to 30° C. above the melting point of the polymer. If the boiling point of the glycol to be eliminated is substantially higher than this temperature, the polycondensation can be carried out under reduced pressure so as to assure complete removal of excess glycol from the melt. Polycondensation temperatures within the range of 180 to 285° C. and preferably between about 210 and 280° C. lead to uniformly good results although departures from these temperatures, i.e., as high as 300° C., may be permissible if some discoloration and degradation is not considered unduly detrimental.

The reactions may be carried out under an inert atmosphere such as nitrogen, at atmospheric, reduced, or superatmospheric pressure. In the preferred embodiment of the method of the invention, a stream of nitrogen is passed through the melt so as to provide an inert atmosphere and at the same time agitate the reactants to assist in removing the alcohol or glycol distilled from the reaction mixture. When glycols are used that boil at temperatures too high for easy elimination at atmospheric pressure and at temperatures unduly close to or above the temperature of thermal degradation of the monomers or polymers, it is desirable to sweep excess glycols out of the melt with an inert gas such as nitrogen, or to operate under reduced pressure as indicated earlier, or to use a combination of these measures.

The reaction may also be carried out by means of the solution polymerization technique that involves dissolving the starting materials in an inert solvent such as paraffin oil or other high boiling aliphatic or aromatic hydrocarbon containing no reactive groups, followed by heating at elevated temperatures under a nitrogen atmosphere until the desired degree of polymerization has been reached or the molecular weight of the product is high enough to precipitate from the hot solution.

In starting with a glycol and a diaralkylene monosulfone, ester interchange catalysts are preferably used. These include such well known catalysts as metallic lithium, sodium, potassium, calcium, beryllium, magnesium, zinc, cadmium, aluminum, chromium, manganese, iron, cobalt, nickel, silver, mercury, tin, lead, bismuth, antimony, platinum and rhodium. The alcoholates, oxides and salts of many of these metals with weak inorganic and organic acids, e.g., zinc borate, are also useful as catalysts in the ester interchange and polymerization reaction. In addition, titanium alkoxides, organo-tin compounds, alkali hydrides, and the like, are suitable as catalysts for the polymerization.

The amount of catalyst used is within the range of about 0.005 to about 0.5% and preferably between about 0.05 and 0.25% based on the total amount of diaralkylene monosulfone that is used. Departures from these ranges are permissible. However, the use of more than about 0.5% can result in discoloration of the ultimate polymer and amounts less than about 0.005% may reduce the rate of reaction to an extent that would not be practicable for commercial operation.

The molar proportion of glycol used for reaction with the sulfone must, as indicated in Equation V, at least equal the molar amount of sulfone and should preferably be at least twice that amount. When a readily removable glycol such as ethylene glycol is used, there is some advantage in using a higher proportion of glycol, e.g., up to about ten mols per mol of sulfone, inasmuch as the glycol will tend to act as a solvent for the catalyst and the excess will assure complete ester exchange. With higher boiling alcohols, however, it is advantageous to use smaller excesses than indicated above.

It is to be understood, of course, that mixtures of monosulfones and mixtures of diols may be employed in order to form copolymers in which different sulfone and glycol residues are present in ordered or random distribution. The polymers so produced are generally somewhat less crystalline, lower melting and softer than those obtained by using a specific sulfone and a specific glycol.

It is also within the scope of the invention, as will readily be appreciated by those skilled in the art, to start with saturated glycolic diesters of the monosulfones and simply subject them to homopolymerization or to start with two or more such glycolic diesters and subject them to copolymerization, thus avoiding the initial ester interchange reaction of sulfone with glycol.

It is also within the scope of the invention to utilize the monosulfone diacids corresponding to the diesters used in accordance with the preferred embodiment of the invention. If the diacids are used, it is preferable to employ either no catalyst or small amounts of catalysts such as para-toluenesulfonic acid, zinc chloride, boron trioxide, camphor sulfonic acid, or the like.

The method, the products and the utility and advantages thereof will become further apparent from the following detailed examples included to illustrate the best modes now contemplated of practicing the invention. In these examples the parts are by weight and the reduced viscosity, used as a measure of the degree of polymerization, is defined by Equation VI:

$$\text{VI.} \qquad I_R = \frac{\left(\frac{\Delta N}{N_0}\right)}{C}$$

in which $\Delta N$ is the difference between flow time of solution and flow time of solvent, $N_0$ stands for flow time of solvent and $C$ is the concentration of the polymer in grams per 100 cc. of solution. Unless otherwise specified, reduced viscosity values were obtained at 47° C., the solvent was a 3:2 mixture of phenol and tetrachloroethane, and the concentration of the polymer in the solution was 0.2 gram/100 cc. For forming shaped articles, reduced viscosities within the range of about 0.3 to about 1.5 are operable and viscosities within the range of about 0.3 to about 1.2 are especially suitable for forming fibers useful in textiles, lower viscosities being desirable for plasticizer utility.

*Example 1*

Dimethyl 4,4'-sulfonylditoluate (10 parts), triethylene glycol (10 parts), dibutyltin oxide (0.003 part), and tetraisopropyl titanate (0.005 part) were charged into a polycondensation reactor suitable for operation at pressures slightly above atmospheric pressure and equipped with a diffuser at the bottom for introduction of nitrogen or any other inert gas. The ester exchange reaction was carried out while the reaction mixture was heated to 230° C. with continuous removal of methanol by forcing a slight stream of nitrogen through the melt. After termination of the methanol distillation the excess glycol was distilled at atmospheric pressure and the polymerization performed subsequently at 230° C. under reduced pressure (1–2 mm.) in a nitrogen atmosphere over a period of 6.25 hours. The resin obtained had a reduced viscosity of 0.58 and melted at 185.5 to 188° C. The polymer could be extruded into strong fibers of excellent pliability. The polymer is also useful as molding resin, electrical insulator, and film-former.

*Example 2*

Dimethyl 4,4'-sulfonylditoluate (10 parts), 3-methyl-1,5-pentanediol (10 parts), magnesium acetate (0.012 part), tetraisopropyl titanate (0.007 part) were heated in a condensation vessel equipped with a gas diffuser at the bottom for one hour at 230° C. in nitrogen atmosphere to bring about the ester exchange. After the methanol distillation was finished the temperature was increased to 235° C. to remove the excess of glycol. The actual polycondensation reaction was performed for 1.5 hours at 235° C. under reduced pressure (1–2 mm.) in a nitrogen atmosphere. A resin having the reduced viscosity of 0.42 and a melting point of 222 to 224° C. was obtained. The polymer showed fiber-forming properties.

*Example 3*

Dimethyl 4,4'-sulfonylditoluate (3 parts), 1,7-heptanediol (6 parts), and tetraisopropyl titanate (0.0045 part) were admixed in a polycondensation reactor equipped with a fine gas diffuser at the bottom. The initial reaction, the ester exchange, was brought about at 220 to 240° C. while passing a gentle stream of nitrogen through the melt. After the termination of the methanol distillation, the temperature was adjusted to 230° C. and the glycol excess was distilled out in ten minutes. The final polymerization was conducted under reduced pressure (1–2 mm.) at 240° C. for 2.5 hours in nitrogen atmosphere. The resulting resin had a reduced viscosity of 1.08 and could be extruded into white filaments which could be cold-stretched 300 to 400%. The melting point of the resin was 232 to 233° C.

*Example 4*

Dimethyl 4,4'-sulfonylditoluate (90 parts), 1,10-decanediol (90 parts), magnesium acetate (0.108 part), and tetraisopropyl titanate (0.045 part) were charged to a condensation reactor and heated for 2.7 hours at 230° C. in nitrogen atmosphere to bring about the ester exchange. After the theoretical amount of methanol was distilled out, the temperature was slowly raised to 240° C. to perform the polycondensation reaction. The polymerization was conducted over a period of 11.1 hours while a vigorous stream of nitrogen (5 liters/min.) was passed through the melt. The polyester obtained had a melting point of 215 to 216° C. and a reduced viscosity of 0.92 at 30° C.

The polymer was melt-spun by a plunger-type extrusion machine at 240° C. using a 30-hole 0.015" spinneret. The filaments formed were drawn over a hot-pin at 90° C. to an extent of 346% into 132 denier filaments. The following physical properties were obtained, the dye affinity being measured in terms of the percentage of total dye absorbed after 120 minutes dyeing:

Tenacity, g.p.d. _____ 3.0
Elongation, percent _____ 15.0
Dye affinity $E_{AB}$, percent _____ 62.5

Outstanding dyeability and excellent resilience represent two of the most striking advantages of this fiber over existing synthetics. The tenacity is within the range desired for a pilling-resistant staple fiber. Recovery from stretch is excellent, as demonstrated by the results of comparative tests with polyethylene terephthalate, said results being tabulated below:

| Stretch, percent | Immediate Recovery, percent of Total Stretch | |
|---|---|---|
|  | Filaments of Example 4 | Filaments of Polyethylene Terephthalate |
| 1 | 95 | 92 |
| 2 | 92 | 61 |
| 3 | 84 | 46 |
| 5 | 51 | 38 |
| 10 | 29 | 20 |

*Example 5*

Dimethyl 4,4'-(sulfonyldiethylene)dibenzoate (10 parts), ethylene glycol (10 parts), dibutyltin oxide (0.003 part), and tetraisopropyl titanate (0.0107 part) were charged into a vessel suitable for operation at pressures slightly above atmospheric and equipped with an agitator and a diffuser at the bottom for introduction of nitrogen. The ester exchange reaction was carried out at 185° C. with continuous removal of methanol by forcing a slight nitrogen stream through the melt. After termination of the methanol distillation, the temperature was raised to 200° C. to distill over the excess of ethylene glycol. The polycondensation reaction itself was carried out at 250° C. for eight hours while purging a vigorous stream of nitrogen through the reaction mixture. After this time, the polycondensation cycle was finished, and a light polymer possessing the reduced viscosity of 0.6 and melting at 228 to 229° C. was obtained. The resin showed good fiber-forming properties and excellent dyeability.

*Example 6*

Dimethyl 4,4'-[sulfonyl-bis(trimethylene)]dibenzoate (9 parts), ethylene glycol (9 parts), tetraisopropyl titanate (0.0117 part) and zinc borate (0.0045 part) were heated in a condensation vessel at 180° C. to perform the ester exchange reaction. After the methanol distillation was finished the temperature of the reaction mixture was increased to 195 to 210° C. and the actual polycondensation was conducted for 7.8 hours while passing a vigorous nitrogen stream through the melt. A resin, having the reduced viscosity of 0.36 and a melting point of 140 to 145° C., was obtained. The polymer could readily be extruded into filaments. The polymer showed properties suggesting application as molding resin and wire coating.

*Example 7*

The general procedure of Example 5 was repeated except that dimethyl 4,4'-[sulfonyl-bis(trimethylene)]dibenzoate (10 parts), 1,4-butanediol (10 parts), tetraisopropyl titanate (0.073 part), and zinc borate (0.005 part) were used in the polymerization reaction. When the initial ester exchange was completed, the temperature was raised to 235° C. and the polycondensation was conducted for about eight hours. The resulting resin had a reduced viscosity of 0.85 and could be extruded into white filaments which could be cold-stretched more than 500%. The melting point of the resin was found to be 162 to 164° C.

*Example 8*

The general procedure of Example 5 was repeated except that dimethyl 4,4'-[sulfonyl-bis(trimethylene)]dibenzoate (10 parts), 1,5-pentanediol (70 parts), tetraisopropyl titanate (0.013 part), and zinc borate (0.005 part) were employed in the polycondensation. After 1.3 hours of ester exchange reaction at 195° C. the temperature was raised to 220 to 230° C. and the polycondensation was performed over a period of eight hours at 2 mm. pressure. The resin obtained had a reduced viscosity of 0.81 and melted at 133 to 135° C. The polymer could be extruded into strong, white fibers of good pliability. The polyester showed also good potentialities as a molding resin and electrical insulator.

Example 9

Dimethyl 4,4'-[sulfonyl-bis(trimethylene)]dibenzoate (3.19 parts), para-xylylene glycol (1.05 parts), magnesium acetate (0.0038 part) and tetraisopropyl titanate (0.0032 part) were placed in a condensation vessel equipped at the bottom for introduction of finely dispersed nitrogen. The initial ester exchange was carried out at 220° C. for a period of 1.5 hours with continuous removal of methanol by a stream of introduced nitrogen (0.1 liter/min.). After the theoretical amount of methanol was collected in the receiver, the temperature was raised to 230° C. for polycondensation and for distillation of the excess glycol over a period of 3.2 hours while passing 0.7 liter/min. of nitrogen through the melt.

The polymer obtained was readily extrudable into filaments which were cold-drawn over 200%. It had reduced viscosity of 0.3 at 30° C. and a melting point at 161° C.

Example 10

Diethyl 4,4'-sulfonylditoluate (8 parts), hexamethylene glycol (7 parts), and calcium (0.008 part dissolved in 2 cc. ethylene glycol) were charged to a polycondensation reactor equipped at the bottom with a gas sparger. The mixture was heated to 220° C. to bring about the ester exchange while passing a gentle stream of nitrogen through the melt. The excess glycol was removed at 250° C. over a period of 1.5 hours. The polymerization was performed for three hours at 275° C., a stream of nitrogen (3 liters/min.) again being passed through the melt.

A high molecular weight polyester was obtained. It had a melting point of 248 to 252° C.

It is to be expected that numerous modifications will readily become apparent to those skilled in the art upon reading this description. All such modifications are intended to be included within the scope of the invention as defined in the appended claims.

What we claim is:

1. A fiber-forming linear polymer consisting essentially of recurring structural units of the general formula

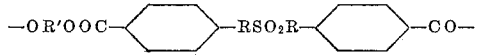

wherein the R's are saturated alkylene radicals containing from one to five carbon atoms and R' stands for a member selected from the group consisting of divalent saturated alkylene, alkylene ether and aralkylene radicals containing from two to ten carbon atoms.

2. Method which comprises heating a mixture consisting essentially of a diaralkylene sulfone of the general formula

wherein the R's are saturated alkylene radicals containing from one to five carbon atoms and the X's are saturated lower alkyl radicals of alcohols having boiling points below about 200° C., with an alpha,omega diol of the general formula

wherein R' stands for a member selected from the group consisting of divalent saturated alkylene, alkylene ether and aralkylene radicals containing from two to ten carbon atoms to a temperature up to about 300° C. to form a fiber-forming linear polymer.

3. Method which comprises heating a mixture consisting essentially of a diaralkylene sulfone of the general formula

wherein the R's are saturated alkylene radicals containing from one to five carbon atoms and the X's are saturated lower alkyl radicals of alcohols having boiling points below about 200° C., with an alpha,omega diol of the general formula $$R'(OH)_2$$

wherein R' stands for a member selected from the group consisting of divalent saturated alkylene, alkylene ether and aralkylene radicals containing from two to ten carbon atoms to a temperature up to about 300° C. to form a resin having a reduced viscosity within the range of about 0.3 to about 1.5 and extruding said resin to filamentary form.

4. A fiber-forming linear polymer consisting essentially of recurring structural units of the formula

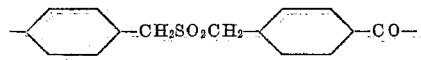

5. A fiber-forming linear polymer consisting essentially of recurring structural units of the formula

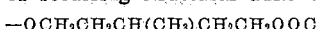
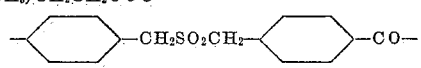

6. A fiber-forming linear polymer consisting essentially of recurring structural units of the formula

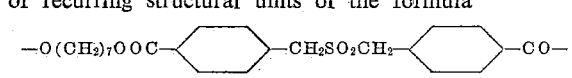

7. A fiber-forming linear polymer consisting essentially of recurring structural units of the formula

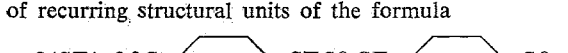

8. A fiber-forming linear polymer consisting essentially of recurring structural units of the formula

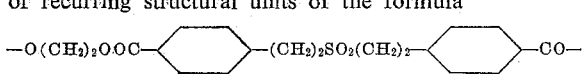

9. A fiber-forming linear polymer consisting essentially of recurring structural units of the formula

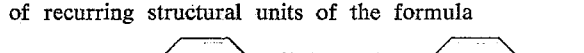

10. A fiber-forming linear polymer consisting essentially of recurring structural units of the formula

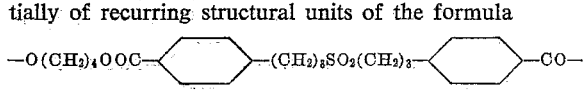

11. A fiber-forming linear polymer consisting essentially of recurring structural units of the formula

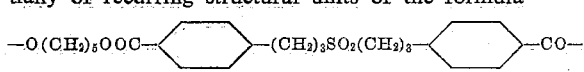

12. A fiber-forming linear polymer consisting essentially of recurring structural units of the formula

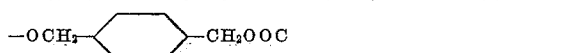
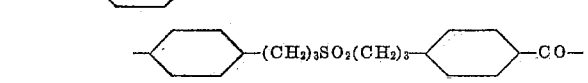

13. A fiber-forming linear polymer consisting essentially of recurring structural units of the formula

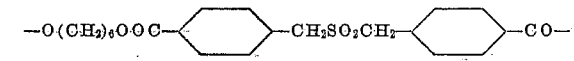

References Cited in the file of this patent

UNITED STATES PATENTS

| Number | Name | Date |
|---|---|---|
| 2,427,640 | Whitehall et al. | Sept. 16, 1947 |
| 2,689,864 | Emerson et al. | Sept. 21, 1954 |
| 2,720,502 | Caldwell | Oct. 11, 1955 |
| 2,744,094 | Caldwell | May 1, 1956 |

UNITED STATES PATENT OFFICE
CERTIFICATE OF CORRECTION

Patent No. 2,999,849 September 12, 1961

Donald M. Young et al.

It is hereby certified that error appears in the above numbered patent requiring correction and that the said Letters Patent should read as corrected below.

Column 1, line 19, for "R's" read -- R''s --.

Signed and sealed this 6th day of March 1962.

(SEAL)
Attest:

ERNEST W. SWIDER
Attesting Officer

DAVID L. LADD
Commissioner of Patents